(12) United States Patent
Ma et al.

(10) Patent No.: US 7,400,761 B2
(45) Date of Patent: Jul. 15, 2008

(54) CONTRAST-BASED IMAGE ATTENTION ANALYSIS FRAMEWORK

(75) Inventors: Yu-Fei Ma, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 806 days.

(21) Appl. No.: 10/676,519

(22) Filed: Sep. 30, 2003

(65) Prior Publication Data

US 2005/0069206 A1 Mar. 31, 2005

(51) Int. Cl.
*G06K 9/34* (2006.01)

(52) U.S. Cl. .................... 382/162; 382/164; 382/190

(58) Field of Classification Search .............. None
See application file for complete search history.

(56) References Cited

U.S. PATENT DOCUMENTS

| | | | |
|---|---|---|---|
| 5,333,091 A | 7/1994 | Iggulden et al. | |
| 5,442,633 A | 8/1995 | Perkins et al. | |
| 5,497,430 A | 3/1996 | Sadovnik et al. | |
| 5,530,963 A | 6/1996 | Moore et al. | |
| 5,625,877 A | 4/1997 | Dunn et al. | |
| 5,642,294 A | 6/1997 | Taniguchi et al. | |
| 5,659,685 A | 8/1997 | Williams et al. | |
| 5,710,560 A | 1/1998 | Cohn | |
| 5,745,190 A | 4/1998 | Ioka | |
| 5,751,378 A | 5/1998 | Chen et al. | |
| 5,774,593 A | 6/1998 | Zick et al. | |
| 5,778,137 A | 7/1998 | Nielsen et al. | |
| 5,801,765 A | 9/1998 | Gotoh et al. | |
| 5,835,163 A | 11/1998 | Liou et al. | |
| 5,884,056 A | 3/1999 | Steele | |
| 5,900,919 A | 5/1999 | Chen et al. | |
| 5,901,245 A * | 5/1999 | Warnick et al. ............. 382/190 |
| 5,911,008 A | 6/1999 | Niikura et al. | |
| 5,920,360 A | 7/1999 | Coleman, Jr. | |
| 5,952,993 A | 9/1999 | Matsuda et al. | |
| 5,959,697 A | 9/1999 | Coleman, Jr. | |
| 5,983,273 A | 11/1999 | White et al. | |
| 5,990,980 A | 11/1999 | Golin | |
| 5,995,095 A | 11/1999 | Ratakonda | |
| 6,047,085 A | 4/2000 | Sato et al. | |
| 6,100,941 A | 8/2000 | Dimitrova et al. | |

(Continued)

FOREIGN PATENT DOCUMENTS

EP 0597450 5/1994

(Continued)

OTHER PUBLICATIONS

"Seeded region growing" Adams, R.; Bischof, L.; Pattern Analysis and Machine Intelligence, IEEE Transactions on vol. 16, Issue 6, Jun. 1994 pp. 641-647.*

(Continued)

*Primary Examiner*—Bhavesh Mehta
*Assistant Examiner*—Sean Motsinger
(74) *Attorney, Agent, or Firm*—Lee & Hayes, PLLC (57) ABSTRACT

Systems and methods for image attention analysis are described. In one aspect, image attention is modeled by pre-processing an image to generate a quantized set of image blocks. A contrast-based saliency map for modeling one-to-three levels of image attention is then generated from the quantized image blocks.

25 Claims, 6 Drawing Sheets

U.S. PATENT DOCUMENTS

| | | | |
|---|---|---|---|
| 6,166,735 | A | 12/2000 | Dom et al. |
| 6,168,273 | B1 | 1/2001 | Dupraz et al. |
| 6,182,133 | B1 | 1/2001 | Horvitz |
| 6,232,974 | B1 | 5/2001 | Horvitz et al. |
| 6,282,317 | B1 | 8/2001 | Luo et al. |
| 6,292,589 | B1 | 9/2001 | Chow et al. |
| 6,353,824 | B1 | 3/2002 | Boguraev et al. |
| 6,408,128 | B1 | 6/2002 | Abecassis |
| 6,421,675 | B1 | 7/2002 | Ryan et al. |
| 6,462,754 | B1 | 10/2002 | Chakraborty et al. |
| 6,466,702 | B1 | 10/2002 | Atkins et al. |
| 6,473,778 | B1 | 10/2002 | Gibbon |
| 6,622,134 | B1 | 9/2003 | Sorkin |
| 6,643,643 | B1 | 11/2003 | Lee et al. |
| 6,643,665 | B2 | 11/2003 | Kimbell et al. |
| 6,658,059 | B1 | 12/2003 | Iu et al. |
| 6,661,468 | B2 | 12/2003 | Alten et al. |
| 6,670,963 | B2 * | 12/2003 | Osberger ............... 345/629 |
| 6,714,909 | B1 | 3/2004 | Gibbon et al. |
| 6,773,778 | B1 | 8/2004 | Onozawa et al. |
| 6,792,144 | B1 | 9/2004 | Yan et al. |
| 6,807,361 | B1 | 10/2004 | Girgensohn et al. |
| 6,870,956 | B2 | 3/2005 | Qi et al. |
| 6,934,415 | B2 * | 8/2005 | Stentiford ............... 382/205 |
| 7,006,091 | B2 | 2/2006 | Masera et al. |
| 7,065,707 | B2 | 6/2006 | Chen et al. |
| 7,116,716 | B2 | 10/2006 | Ma et al. |
| 7,248,294 | B2 | 7/2007 | Slatter |
| 2001/0023450 | A1 | 9/2001 | Chu |
| 2002/0069218 | A1 | 6/2002 | Sull et al. |
| 2002/0157116 | A1 | 10/2002 | Jasinschi |
| 2002/0166123 | A1 | 11/2002 | Schrader et al. |
| 2003/0033347 | A1 | 2/2003 | Bolle et al. |
| 2003/0123850 | A1 | 7/2003 | Jun et al. |
| 2003/0152363 | A1 | 8/2003 | Jeannin et al. |
| 2003/0210886 | A1 | 11/2003 | Li et al. |
| 2003/0237053 | A1 | 12/2003 | Chen et al. |
| 2004/0040041 | A1 | 2/2004 | Crawford |
| 2004/0068481 | A1 | 4/2004 | Seshadri et al. |
| 2004/0078357 | A1 | 4/2004 | LaChapelle et al. |
| 2004/0078382 | A1 | 4/2004 | Mercer et al. |
| 2004/0078383 | A1 | 4/2004 | Mercer et al. |
| 2004/0085341 | A1 | 5/2004 | Hua et al. |
| 2004/0088726 | A1 | 5/2004 | Ma et al. |
| 2004/0165784 | A1 | 8/2004 | Xia et al. |
| 2004/0184776 | A1 | 9/2004 | Inoue et al. |
| 2006/0239644 | A1 | 10/2006 | Barbleri |
| 2007/0027754 | A1 | 2/2007 | Collins et al. |
| 2007/0060099 | A1 | 3/2007 | Ramer et al. |

FOREIGN PATENT DOCUMENTS

| | | |
|---|---|---|
| EP | 1168840 | 1/2002 |
| EP | 1213915 | 6/2002 |
| GB | 2356080 | 5/2001 |
| KR | 20020009089 A | 2/2002 |
| KR | 20040042449 A | 5/2004 |
| WO | WO0028467 | 5/2000 |

OTHER PUBLICATIONS

"Peer group filtering and perceptual color image quantization" Yining Deng; Kenney, C.; Moore, M.S.; Manjunath, B.S.; Circuits and Systems, 1999. ISCAS '99. Proceedings of the 1999 IEEE International Symposium on vol. 4, May 30-Jun. 2, 1999 pp. 21-24 vol. 4.*

U.S. Appl. No. 10/371,125, filed Feb. 20, 2003; Inventors: Wei-Ying Ma et al., Entitled "Systems and Methods for Enhanced Image Adaptation".

U.S. Appl. No. 10/286,053, filed Nov. 1, 2002; Inventors; Yu-Fei Ma et al., Entitled "Systems and Methods for Generating a Comprehensive User Attention Model".

U.S. Appl. 10/286,348, filed Nov. 1, 2002; Inventors Xian-Sheng Hua et al. Entitled "Systems and Methods for Automatically Editing a Video".

U.S. Appl. 10/285,933, filed Nov. 1, 2002; Inventors Yu-Fei Ma et al.: Entitled "Systems and Methods for Generating a Motion Attention Mode".

http://www.fatalfx.com/nomad/"NOMAD (No More Advertising)" Feb. 17, 2003; 4 pages.

Cherry, Steven M.; "Pesky Home Networks Trouble Cable Behemoths" IEEE Spectrum, Apr. 2002, pp. 60-61.

Hargrove, Thomas; "Logo Detection in Digital Video" Math 100, Mar. 6, 200, http://toonarchive.com/logo-detection/; 9 pages.

Held, Gibert; "Focus on Agere System'Orinoco PC Card" International Journal of Network Management, May/Jun. 2002, pp. 187-193.

Jha, Uma S.; "Wireless Landscape-Need for Seamless Connectivity" Wireless Personal Communications 2002 pp. 275-283.

Lienhart, R. et al.; "On the Detection and Recognition of Television Commercials" University of Mannheim, 17 pages.

Lu, Lie et al.; "A Robust Audio Classification and Segmentation Method" Microsoft Research, China, 9 pages.

Ahmad, Subutai; "Visit: A Neural Model of Covert Visual Attention" Advances in Neural Information Processing System, v. 4, 1991, pp. 420-427.

Baluja et al.; "Expectation-Based Selective Attention for Visual Monitoring and Control of a Robot Vehicle" Robotics and Autonomous System, v.22 No. 3-4, Dec. 1997, pp. 329-344.

Deng et al.; "Peer Group Filtering and Perceptual Color Image Quantization" Proceedings of IEEE International Symposium on Circuits and Systems, vol. 4, 1999, pp. 21-24.

Jing et al.; "An Effective Region-Based Image Retrieval Framework" From ACM Multimedia, 2002, 28 pages.

Li et al.; "Statistical Learning of Multi-View Face Detection" Proceedings of ECCV, 2002, 25 pages.

Milanese R. et al.; "Attentive Mechanisms for Dynamic and Static Scene Analysis" Optical Engineering, v34 No. 8, Aug. 1995, pp. 2428-2434.

Lu, Lie et al.; "Content Analysis for Audio Classification and Segmentation" IEEE Transactions on Speech and Audio Processing, vol. 10 No, 7, Oct. 2002, pp. 504-516.

Lu, Lie et al.; "Content-Based Audio Segmentation Using Support Vector Machines" IEEE, 2001, pp. 956-959.

Sadlier, David A.; "Automatic TV Advertisement Detection from MPEG Bitstream" Centre for Digital Video Processing/Research Institute for Network & Communication Eng., Dublin City University, 12 pages.

Sanchez, Juan Maria; "AudiCom: A Video Analysis System for Auditing Commercial Broadcasts" Computer Vision Center Department d'Informatica Universitat Autonoma de Barcelona, 5 pages.

Zabih, Ramin; "A Feature-Based Algorithm for Detecting and Classifying Scene Breaks" Computer Science Department, Cornell University, 16 pages.

O'Toole, Colin et al.; "Evaluation of Automatic Shot Boundary Detection on a Large Video Test Suite" School of Computer Applications & School of Electronic Engineering, Dublin City University, Glasnevin Dublin Ireland Challenge of Image Retrieval, Newcastle, 1999, pp. 1-12.

Itti et al.; "Computational Modelling of Visual Attention" Nature Reviews/Neuroscience, vol. 2, Mar. 2001, pp. 1-11.

Itti et al.; "Comparison of Feature Combination Strategies for Salincey-Based Visual Attention Systesm" Proc. of SPIE Human Vision and Electronic Imaging IV (HVEI'99), San Jose CA, vol. 3644, Jan. 1999., pp. 473-482.

Itti et al.; "A Model of Saliency-based Visual Attention for Rapid Scene Analysis" IEEE Trans. on Pattern Analysis and Machine Intelligence, 1998, 5 pages.

Lee, Keansub et al.; "Perception-Based Image Transcoding for Universal Multimedia Access" School of Electrical Engineering Korea University, Seoul Korea, 2001, IEEE, pp. 475-478.

T. Lin et al.; "Video Scene Extraction by Force Competition" IEEE Intl. Conference on Multimedia and Expo (ICME 001), Waseda University, Tokyo Japan, Aug. 2001, 4 pages.

Niebur, E. et al.; "Computational Architectures for Attention" The Attentive Brain, Chapter 9, 1998, pp. 163-186.
Sahoo P.K. et al.; "Threshold Selection Using a Minimal Histogram Entropy Difference" Optical Engineering, v36 No. 7, Jul. 1997, pp. 1976-1981.
Tsotsos J. K. et al.; "Modelling Visual Attention Via Selective Tuning" Artificial Intelligence v78 1995 pp. 507-545.
Wolfe J. M. et al.; "Deploying Visual Attention: The Guided Search Model" AI and the Eye, Chapter 4, 1990, pp. 79-103.
Zadeh L. A.; "Probability Measures of Fuzzy Events" Journal of Mathematical Analysis and Applications, 23, 1968, pp. 421-427.
M.A. Smith et al.; "Video Skimming and Characterization Through the Combination of Image and Language Understanding Techniques" Proc. of Computer Vision and Pattern Recognition, 1997, IEEE, pp. 775-781.
Divakaran et al; "Video Summarization Using Descriptors of Motion Activity: A Motion Activity Based Approach to Key-Frame Extraction from Video Shots" Journal of Electronic Imaging, Oct. 2001, vol. 10 No. 4, pp. 909-916.
Yu-Fei Ma & Hong Jiang Zhang; "A Model of Motion Attention for Video Skimming" Microsoft Research, Asia, 4 pages.
Yu-Fei Ma & Hong-Jiang Zhang; "A New Perceived Motion Based Shot Content Representation" Microsoft Research, China, 4 pages.
Fan, et al., "Visual Attention Based Image Browsing on Mobile Devices" 4 pages.
Goncalves, "Towards a Learning Model for Feature Integration in Attention Control", retrieved on Jul. 19, 2006 at <<http://ieeexplore.ieee.org/search.srchabstract.jsp?arnumber=1013553&isnumber=21824&pun>>, International Conference on Multisensor Fusion and Integration for Intelligent System, Aug. 20-22, 2001, pp. 311-316.
Osberger, et al., "An Automatic Image Quality Assessment Technique Incorporating Higher Level Perceptual Factors", retrieved on Jul. 19, 2006, at <<http://ieeexplore.ieee.org/search/srchabstract.jsp?arnumber727227&isnumber==15680&punu>>, International Conference on Image Processing, vol. 3, Oct. 4-7, 1998, pp. 414-418.
Zhang et al., "A Hierarchical Organization Scheme for Video Data" Pattern Recognition, Elsevier, Kidlington, GB, vol. 35, No. 11, Nov. 2002, pp. 2381-2387.
"Advanced Digital Video Storage and On-line Retrieval System", Advisor Project, Jun. 30, 2000, retrieved from the Internet http://advisor.matrasi.tis.fr/DUP_Workshop_sheet.pdf.
Bertini et al., "Indexing for Resue of TV News Shots" Pattern Recognition, Elsevier, Kidlington, GB, vol. 35, No. 3, Mar. 2002, pp. 581-591.
Lee et al., "Automatic Video Parsing Using Shot Boundary Detection and Camera Operation Analysis" Pattern Recognition, Elsevier, Kidlington, GB, vol. 34, No. 3, Mar. 2001, pp. 711-719.
Alexander, et al., "Informedia: News-on-Demand Multimedia Information Acquisition and Retrieval", 1997, pp. 1-21.
DeMenton, et al., "Video Summarization by Curve Simplification", ACM, 1998, pp. 211-218.
Gong, et al., "Creating Motion Video Summaries with Partial Audio-Visual Alignment", IEEE, 2002, pp. 285-288.
Beg, "User Feedback Based Enhancement in Web Search Quality", Elsevier Science Inc., Feb. 2005, vol. 170, pp. 20.
Bennett, et al., "Proscenium: A Framework for Spatio-Temporal Video Editing", MM'03, Nov. 2-3, ACM 2003, Berkeley, California, pp. 8.
Fan, et al., "Visual Attention Based Image Browsing On Mobile Devices", IEEE Computer Society 2003, vol. 2, pp. 4.
Foote, et al., "Creating Music Video using Automatic Media Analysis", ACM 2000, pp. 8.
Girgensogn, et al., "Home Video Editing Made Easy— Balancing Automation and User Control", 2001, pp. 8.
Graham, et al., "The Video Paper Multimedia Playback System", MM '03, Nov. 2-8, 2003, pp. 2.
Hua, et al., "Automatically Converting Photographic Series into Video", MM '04, Oct. 10-16, 2004, New York, N Y, pp. 8.
Hua, et al., "AVE—Automated Home Video Editing", MM'03, Nov. 2-8, 2003, ACM, New York, N Y, pp. 8.
Hua, et al., "Video Booklet", 2005 ACM, pp. 4.
Kelly, et al., "Implicit Feedback for Inferring User Preference: A Bibliography", SIGIR Forum, vol. 37, No. 2, 2003, pp. 18-28.
"NOMAD (No More Advertising)", retrieved on Jun. 28, 2004, at <<http://www.fatalfx.com/nomad/>>, pp. 1-4.
Pirolli, "Exploring Browser Design Trade-offs Using a Dynamical Model of Optimal Information Foraging", Proc. SIGHI Conference on Human factors in Computing Systems CHI, 1998, pp. 33-40.
Smith, et al., "Scalable Multimedia Delivery for Pervasive Computing", ACM, 1999, pp. 131-140.
Sugiyama, et al., "Adaptive Web Search Based on User s Implicit Preference", DEWS, 2004, pp. 8.
Yip, et al., "The Automatic Video Editor", Nov. 2-8, 2003, Berkeley, California, pp. 2.
Fan, et al., "Visual Attention Based Image Browsing on Mobile Devices" 4 pages, 2003.
Girgensogn, et al., "A Semi-automatic to Home Video Editing", UIST 2000, San Diego, CA, 9 pages.
Chen et al.; "A Visual Attention Model for Adapting Images on Small Displays" ACM Multimedia Systems Journal, 2003.
Chen, Jinlin et al.; "Function-based Object Model Towards Webset Adaptation" Proc. of the 10th Int. WWW Conf., 2001, pp. 1-21.
Christopoulos, Charilaos et al.; "The JPEG2000 Still Image Coding System: An Overview" IEEE Transactions on Consumer Electronics, vol. 46 No. 4, Nov. 2000, pp. 1103-1127.
Gamaz et al.; "Robust Scene-Change Detection in MPEG Compressed Domain" Elec & Comp. Eng., 1998, pp. 95-99.
Gu et al.; "Dissolve Detection in MPEG Compressed Video" IEEE, 1997, pp. 1692-1696.
Heng et al.; "Post Shot Boundary Detection Technique: Flashlight Scene Determination" University of Western Australia, 1999, pp. 447-450.
Lelescu et al.; "Real-time Scene Change Detection on Compressed Multimedia Bitstream Based on Statistical Sequential Analysis" IEEE, 2000, pp. 1141-1144.
Ma et al.; "A User Attention Model for Video Summarization" Proceedings of ICIP, 2002.
O'Toole; "An MPEG-1 Shot Boundary Detector Using XIL Colour Histograms" Dublin City University, 1998, pp. 1-7.
Yeo et al.; "Rapid Scene Analysis on Compressed Video" IEEE, 1995, pp. 533-544.
Yusoff et al.; "Video Shot Cut Detection Using Adaptive Thresholding" University of Surrey, 2000, pp. 1-10.
Yu-Fei Ma & Hong Jiang Zhang; "A Model of Motion Attention for Video Skimming" Microsoft Research, Asia, 4 pages, 2002.
Yu-Fei Ma & Hong-Jiang Zhang; "A New Perceived Motion Based Shot Content Representation" Microsoft Research, China, 4 pages, 2001.

* cited by examiner

Fig. 9 — An Exemplary Original Image 212
Fig. 10 — An Exemplary Quantized Block Image 214
Fig. 11 — An Exemplary Contrast-Based Saliency Map 216

Fig. 12 — Fuzzy Partition 222
Fig. 13 — Exemplary Attended Area(s) 220
Fig. 14 — Exemplary Attended Point(s) 218

Fig. 45

CONTRAST-BASED IMAGE ATTENTION ANALYSIS FRAMEWORK

TECHNICAL FIELD

The invention pertains to image analysis.

BACKGROUND

Effective information retrieval from a large image library is generally a function of subject matter retrieval accuracy and an adaptive image display scheme for suitable presentation by a variety of different and computing devices, many of which are of compact design. Such small form factor computing devices include, for example, handheld computing and/or communication devices, many of which have limited display, processing, and/or memory capabilities. The question of how to identify important/representative regions of an image is related to both retrieval accuracy and adaptive image display. If semantics of each region of an image are known beforehand, these questions are easily solved. However, programmatic determination of image semantics is generally considered to be a machine intelligence issue and computationally intensive task, not to mention, one that is beyond capabilities of most conventional computer vision systems. Accordingly, alternatives to semantic understanding of image content are desired for improved information retrieval and adaptive image display.

SUMMARY

Systems and methods for contrast-based image attention analysis are described. In one aspect, image attention is modeled by preprocessing an image to generate a quantized set of image blocks. A contrast-based saliency map for modeling one-to-three levels of image attention is then generated from the quantized image blocks.

BRIEF DESCRIPTION OF THE DRAWINGS

In the figures, the left-most digit of a component reference number identifies the particular figure in which the component first appears.

DETAILED DESCRIPTION

Overview

Systems and methods for generating a contrast-based saliency map for image attention analysis are described. In particular, the following framework maps contrast-based saliency via local (i.e., regional) contrast analysis. Fuzzy growing is then used to simulate human perception and to extract attended objects from the contrast-based saliency map. These attended objects include, for example, attended views, attended areas and attended points, each of which are then utilized to provide three-levels of attention data for image analysis. An attended view can effectively accelerate feature extraction during image retrieval by extracting a sub-image with information that has been objectively determined to be most important. Attended areas provide more details about substantially important areas for region-based image retrieval operations. Also, both attended view and attended areas may facilitate quick browsing of important parts of image in a variety of display screens in different sizes. Moreover, although the attended points lack of semantics, they provide users possible search paths on images, which can be utilized to determine the browsing sequence of image regions.

In these manners, the systems and methods of the invention provide a considerably robust alternative to semantic understanding for image retrieval and adaptive image display—especially since the vision system automatically extracts attentions in images via simulation of human perception. Exemplary systems and methods for generating a contrast-based saliency map for image attention analysis are now described in greater detail.

Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

Figure 1:
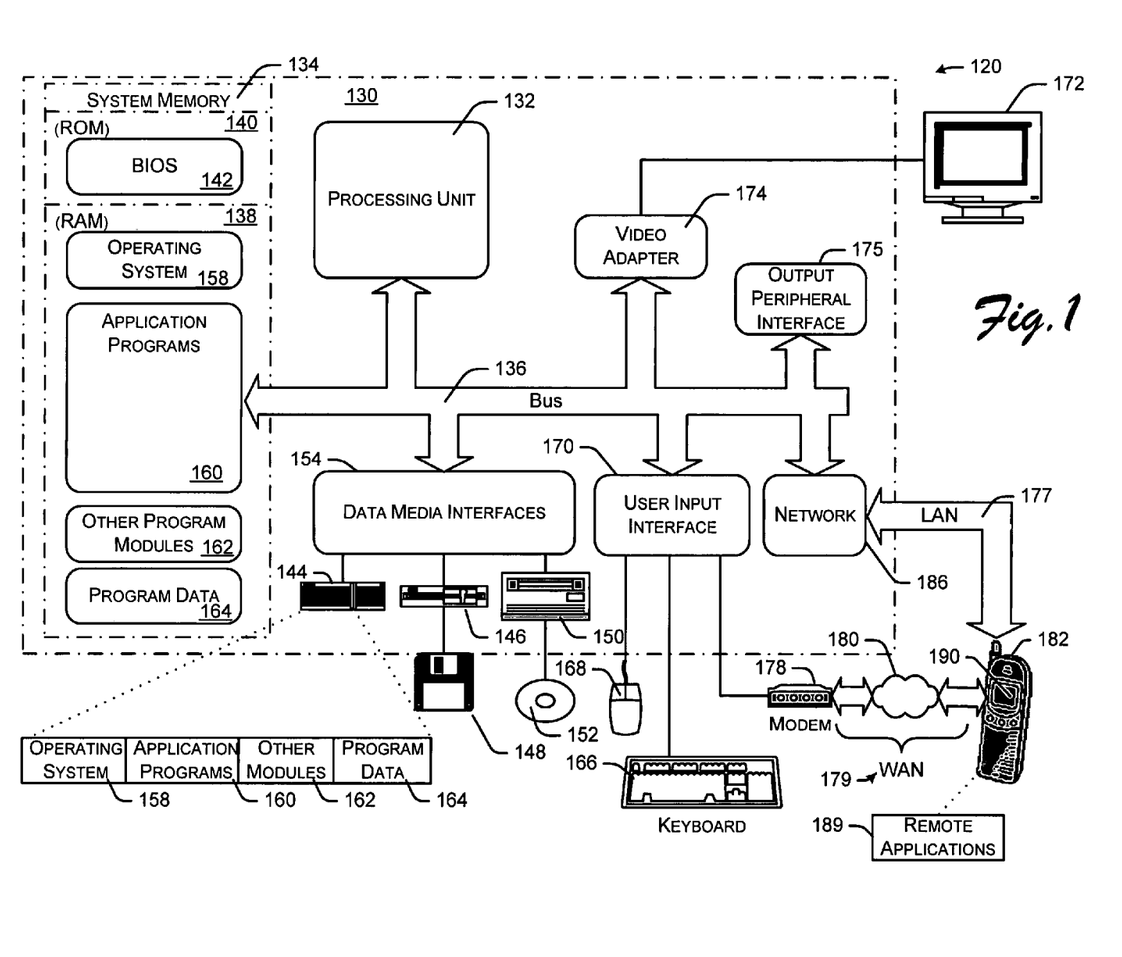
FIG. 1 shows an exemplary computing environment within which systems and methods for generating a contrast-based saliency map for image attention analysis may be implemented.

FIG. 1 illustrates an example of a suitable computing environment 120 on which the subsequently described systems, apparatuses and methods for generating a contrast-based saliency map for image attention analysis may be implemented. Exemplary computing environment 120 is only one example of a suitable computing environment and is not intended to suggest any limitation as to the scope of use or functionality of systems and methods the described herein. Neither should computing environment 120 be interpreted as having any dependency or requirement relating to any one or combination of components illustrated in computing environment 120.

The methods and systems described herein are operational with numerous other general purpose or special purpose computing system environments or configurations. Examples of well-known computing systems, environments, and/or configurations that may be suitable include, but are not limited to, including small form factor (e.g., hand-held, mobile, etc.) computing devices (e.g., mobile phones, personal digital assistants—PDAs, etc.), multi-processor systems, microprocessor based or programmable consumer electronics, network PCs, minicomputers, mainframe computers, and/or so on. The invention is also practiced in distributed computing environments where tasks are performed by remote processing devices that are linked through a communications network. In a distributed computing environment, program modules may be located in both local and remote memory storage devices.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132. Bus 136 represents one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media. System memory 134 includes computer readable media in the form of volatile memory, such as random access memory (RAM) 138, and/or non-volatile memory, such as read only memory (ROM) 140. A basic input/output system (BIOS) 142, containing the basic routines that help to transfer information between elements within computer 130, such as during start-up, is stored in ROM 140. RAM 138 typically contains data and/or program modules that are immediately accessible to and/or presently being operated on by processor 132.

Computer 130 may further include other removable/non-removable, volatile/non-volatile computer storage media. For example, a hard disk drive 144 may be used for reading from and writing to a non-removable, non-volatile magnetic media (not shown), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 140, or RAM 138, including, e.g., an operating system 158, one or more application programs 160, other program modules 162, and program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, digital camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include some or all of the elements and features described herein relative to computer 130. Logical connections include, for example, a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180. In this example, the remote computer 182 happens to be a small form factor device in the embodiment of a mobile telephone with a small display screen. The remote computer is representative of all possible types of computing devices that can be coupled to the computer 130 as described.

In a networked environment, program modules depicted relative to computer 130, or portions thereof, may be stored in a remote memory storage device. Thus, e.g., as depicted in FIG. 1, remote application programs 189 may reside on a memory device of remote computer 182. The network connections shown and described are exemplary. Thus, other means of establishing a communications link between the computing devices may be used.

Exemplary Application Programs and Data

Figure 2:
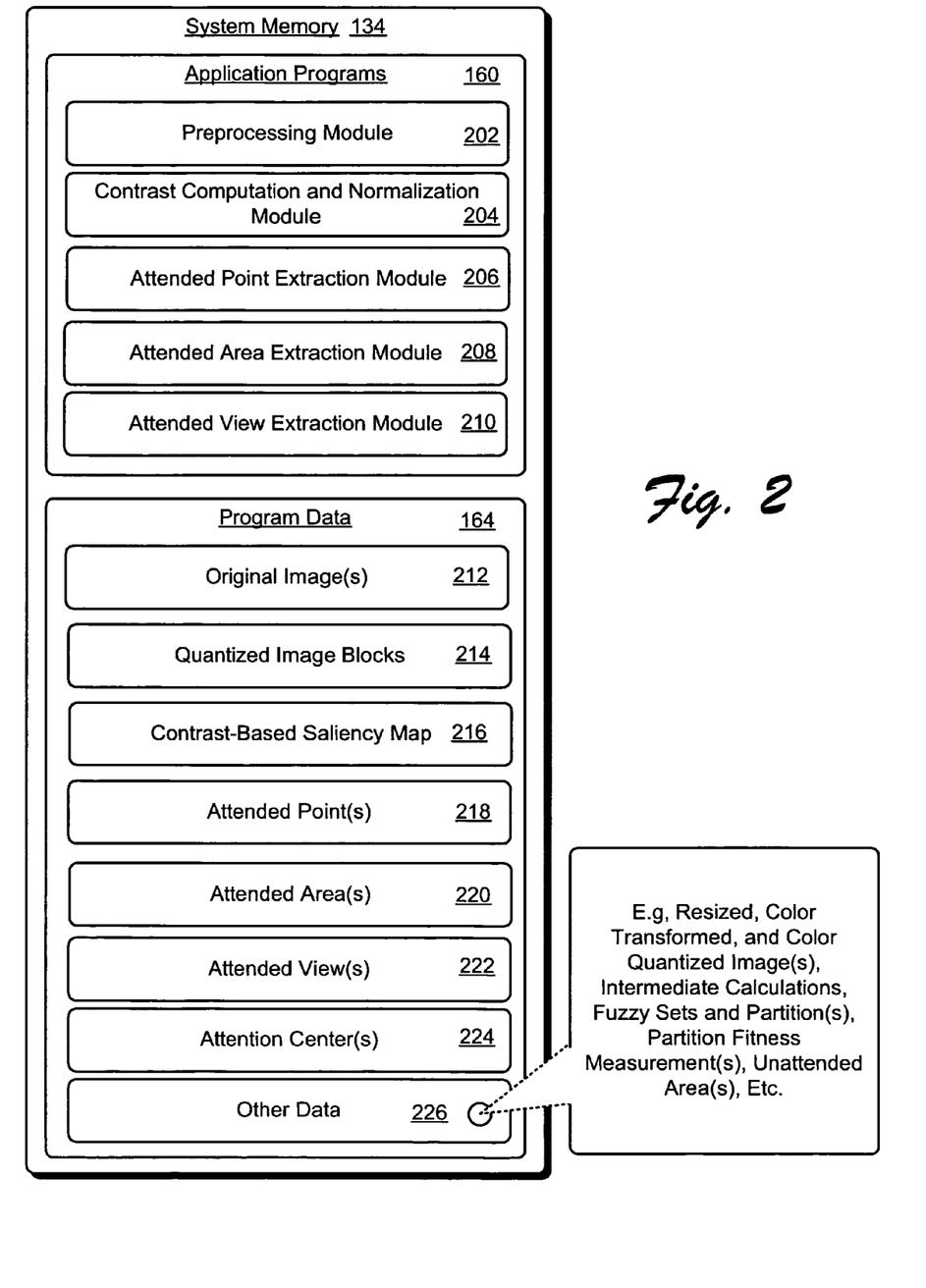
FIG. 2 shows further exemplary aspects of system memory of FIG. 1, including application programs and program data for generating a contrast-based saliency map for image attention analysis.

FIG. 2 is a block diagram that shows further exemplary aspects of system memory 134 of FIG. 1, including application programs 160 and program data 164 for generating a contrast-based saliency map for image attention analysis. In this implementation, application programs 160 include, for example preprocessing module 202, contrast computation and normalization module 204, attended point extraction module 206, attended area extraction module 208, and attended view extraction module 210. Aspects of these computer-program modules and their operations are now described in detail in reference to exemplary images of FIGS. 3 through 44.

Contrast-Based Saliency

Contrast is an important parameter in assessing vision. Clinical visual acuity measurements generally rely on high contrast, that is, black letters on a white background. However, objects and their surroundings are typically of varying contrast. Therefore, the relationship between visual acuity and contrast allows a more detailed understanding of human visual perception. Traditional image processing techniques usually consider an image by three basic properties, color, texture, and shape. Although these techniques have been successfully applied to a number of applications, they cannot provide high level understanding of an image, because humans usually do not perceive images from color, texture, and shape aspects separately. The systems and methods of the invention address these limitations of conventional systems by utilizing contrast attention analysis. Contrast attention analysis is especially pertinent to image analysis. Whether an object can be perceived depends on the distinctiveness (i.e., contrast) between the object and its environment. Moreover, contrast perception underlies each of the separate components of color, texture, and shape perception.

Figure 3:
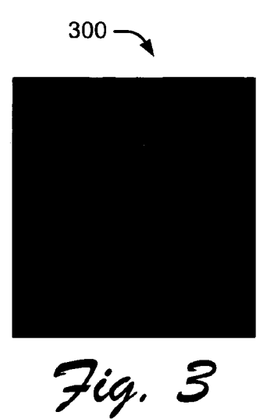
FIGS. 3-8 show respective images that illustrate how contrast underlies color, texture, and shape perception. In particular, figure pairs 3 and 4, 5 and 6, and 7 and 8 represent synthesized image pairs.
Figure 4:
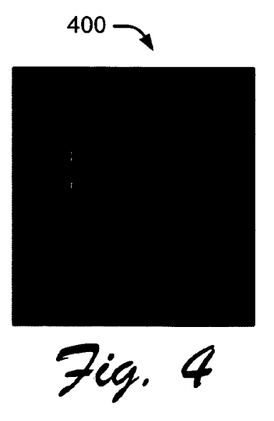

FIGS. 3-8 illustrate how contrast underlies color, texture, and shape perception. For purposes of discussion, aspects of these figures are described in terms of color other than the various shades of grayscale color that are shown in the figures. In particular, figure pairs 3 and 4, 5 and 6, and 7 and 8, each represent respective pairs of synthesized images. In FIG. 3, there is an image 300 including red box on black background. The attended area 220 in image 300 is the red box. Red color is usually considered as bright color which easily attracts human attentions. However, the image 400 of FIG. 4 cannot support this assumption. Rather, the black box of image 400 becomes the attended area 220 though red background occupies most of image 400. This phenomenon indicates that the color and size are not most pivotal factor for human perception, although human visual sensitivity has some intentions in color and size. Color contrast plays an important role in the human perception process.

Figure 5:
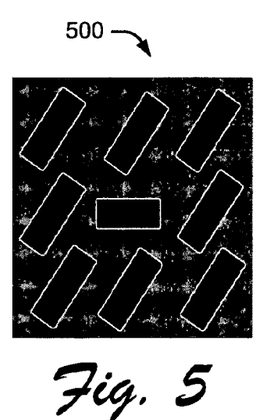
Figure 6:
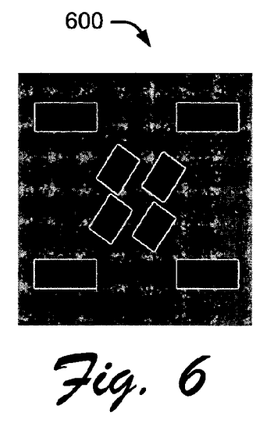
Figure 7:
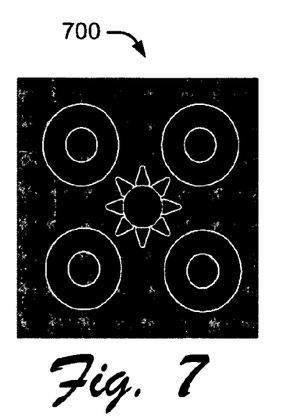
Figure 8:
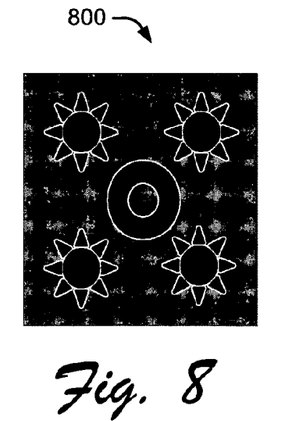

FIGS. 5 and 6 show respective textured images 500 and 600, wherein oriented rectangles are surrounded by the texture. FIG. 5 is illustrative of a weak texture area (central portions) surrounded by the strong texture patches around the border portions of the rectangle. Whereas in FIG. 6, a strong textured area is surrounded by weak texture patches. Similar to color, the strength of texture does not greatly influence human perception, as does contrast. A similar conclusion can also be drawn from FIGS. 7 and 8. Additionally, the complexity of shape is not the main factor in human perception. From above comparisons, regions with high contrast are indicative of areas of rich information and are most likely to attract human attentions.

There are a number of known techniques to compute contrast, such as color contrast and luminance contrast. However, these techniques do not provide the type of contrast determinations needed for generation of the contrast-based saliency map 216 of FIG. 2. Rather, a more generic contrast is utilized. In particular, an effectual area is identified as one of perceiving stimulus, and is called a perceive field. The perceive field is the unit of contrast. The perceive field is analogous to a receptive field as identified by a human eye. An image with the size of M×N pixels is regarded as a perceive field with M×N perception units, if each perception unit contains one pixel. The contrast value $C_{ij}$ on a perception unit (i, j)—a perceive field, is defined as follows:

$$C_{i,j} = \sum_{q \in \Theta} d(p_{i,j}, q), \qquad (1)$$

where $p_{ij}$ (i∈[0, M], j∈[0, N]) and q denote the stimulus perceived by perception units, such as color. $\Theta$ is the neighborhood of perception unit (i, j). The size of $\Theta$ controls the sensitivity of perceive field. The smaller the size of $\Theta$, the more sensitive the perceive field is. Parameter d is the difference between $p_{ij}$ and q, which may employ any distance measure such as $L_1$ and $L_2$ distances.

Preprocessing to Resize, Transform, Quantize, and Divide Images

Figures 9, 10, 11:
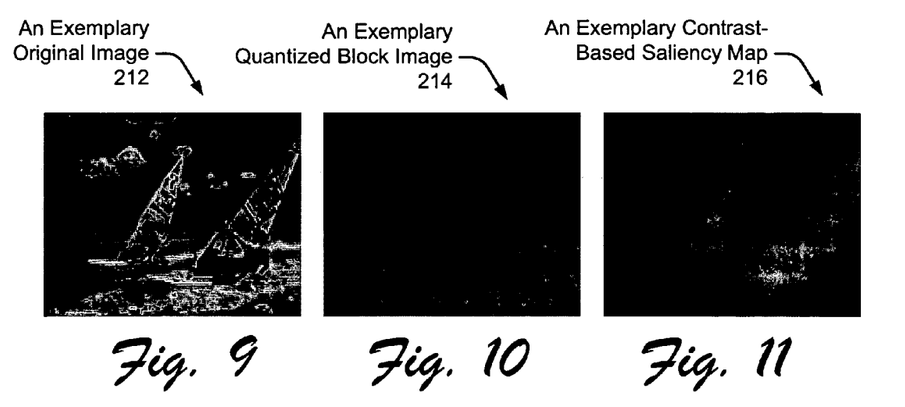
FIG. 9 shows an example of an original image prior to preprocessing and quantization.
FIG. 10 shows an example of the original image of FIG. 9 after quantization operations.
FIG. 11 shows an example of a contrast-based saliency map derived from the quantized image of FIG. 10.

Preprocessing module 202 quantizes an original image 212 to generate quantized block image 214. FIG. 9 shows an example of an original image 212. FIG. 10 shows an example of the original image of FIG. 9, after it has been quantized. To this end, the preprocessing module 202 resizes the original image 212, while maintaining the original images aspect ratio. This effectively reduces computational complexity and maintains all images in a same configurable scale. If not already in a selected color space, such as LUV color space, the color space transformation is performed to transform the resized image to the selected color space. In this implementation, and since LUV space is consistent with human color perception, the resized image is transformed, for example, from RGB space to LUV space—a human perceptible color space.

The preprocessing module 202 color quantizes the transformed image. Human vision perception is more sensitive to the changes in smooth areas than to changes in areas of texture. To facilitate such perception, the color quantization operation makes color coarser in texture areas. In this implementation, well-known techniques to perform peer group filtering and perceptual color quantization of the transformed image are utilized for this operation. To further smooth texture areas and reduce computational cost, the preprocessing module 202 divides the quantized image into blocks, which for purposes of discussion are shown as quantized image blocks 214. Each quantized block is a perception unit with a perceive field of a certain number of pixels. In this implementation, the quantized image is divided into blocks of 8×8 pixels. LUV elements of each perception unit are computed separately.

Contrast Computation, Normalization, and Attended Data Extraction

Figures 12, 13:
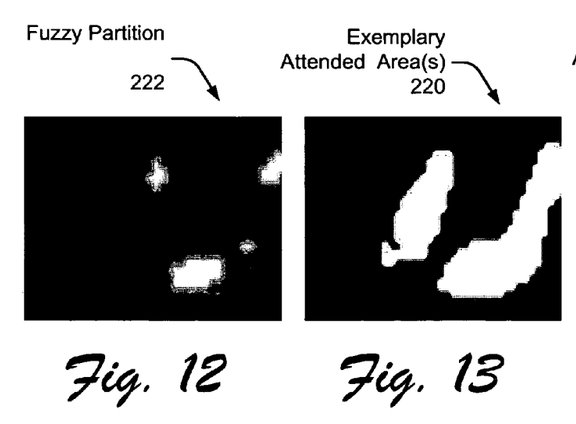
FIG. 12 illustrates an exemplary fuzzy 2-partition of contrast-based saliency map. In particular, three layers are shown which denote a gray level higher than a (highest), s (middle), and u (lowest) layer.
FIG. 13 shows exemplary results of fuzzy growing by treating a contrast-based saliency map as a fuzzy event in view of mutually exclusive attended and non-attended areas.
Figure 14:
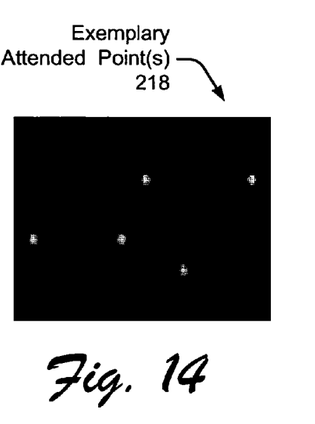
FIG. 14 shows exemplary attended points derived from a contrast-based saliency map.
Figure 15:
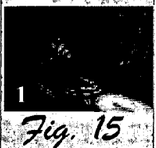
FIG. 15-44 show respective examples of contrast-based saliency maps, attended view, attended areas, and attended points, each of which has been derived from respective original images, as illustrated.
Figure 16:
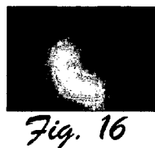
Figure 17:
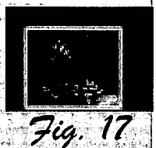
Figure 18:
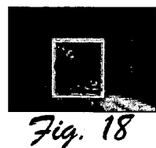
Figure 19:
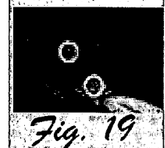
Figure 20:
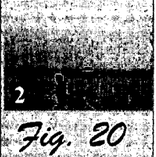
Figure 21:
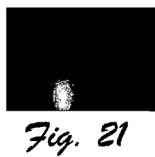
Figure 22:
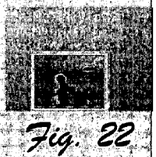
Figure 23:
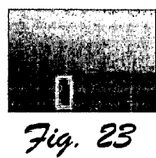
Figure 24:
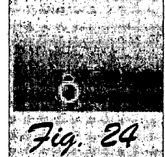
Figure 25:
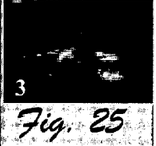
Figure 26:
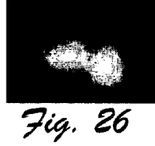
Figure 27:
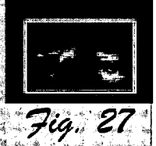
Figure 28:
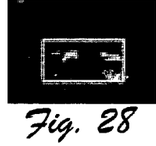
Figure 29:
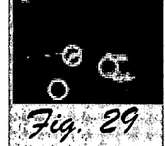
Figure 30:
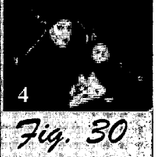
Figure 31:
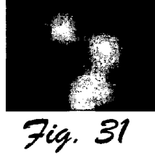
Figure 32:
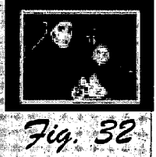
Figure 33:
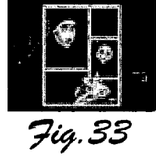
Figure 34:
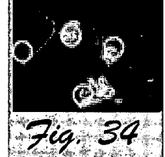
Figure 35:
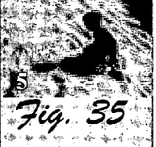
Figure 36:
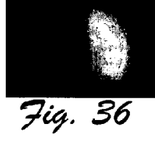
Figure 37:
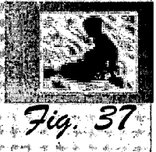
Figure 38:
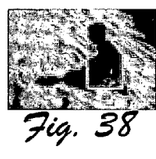
Figure 39:
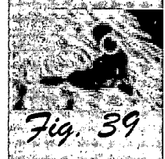
Figure 40:
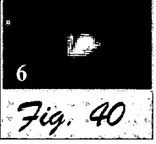
Figure 41:
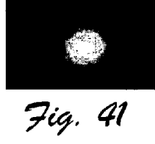
Figure 42:
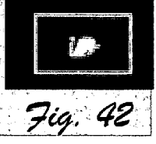
Figure 43:
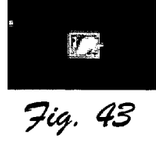
Figure 44:
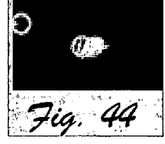

At this point, preprocessing operations have completed, and the contrast computation and normalization (CCN) module 204 calculates a respective contrast for each of the quantized blocks 214. The CCN module 204 then smoothes and normalizes the calculated contrasts $C_{ij}$ on the perception units to [0, 255]. This generates the contrast-based saliency map 216. FIG. 11 shows an example of a contrast-based saliency map 216 derived from the original image of FIG. 9 and the quantized image of FIG. 10. Three-levels of attention data, attended points 218, attended areas 220, and attended views are extracted from a contrast-based saliency map 216. FIGS. 12-14 illustrate these contrast-based attention data that have been extracted by the CCN module 204 from the exemplary embodiment of the saliency map 216 of FIG. 11. In particular, FIG. 12 shows exemplary intermediate result of fuzzy partition 222, which have been generated by fuzzy growing as described below. FIG. 13 illustrates exemplary attended areas 220. FIG. 14 shows exemplary attended points 218.

In this implementation, colors in LUV space are used as stimulus on each perceive field, and the difference d is computed by Gaussian distance. Image attention analysis is performed on local contrast in the contrast-based saliency map 216, because this kind of saliency map not only reflects color contrast, but also reflects strength of texture. Additionally, areas close to the boundary of objects tend to have same or similar contrasts. Therefore, the contrast-based saliency map 216 further presents color, texture and approximate shape information, and thereby provides robust information for image attention analysis.

Attended Points Extraction

Attended point extraction module 206 directly detects and extracts attended points 218 from the contrast-based saliency map 216. Attended points 218 are points in the contrast-based saliency map 216 with local maximum contrast. Attended point detection is analogous to detection of a lowest level of human attention that has been directly caused by outside stimulus. As a result, attended points do not have any semantics. In this implementation, a maximum top five (5) points are extracted, because humans generally cannot focus on too many objects at the first glance. In a different implementation, some other number of attended points 218 is extracted from the contrast-based saliency map 216.

Attended Areas Extraction

Attended areas 220 are generated by the attended area extraction module 208. The result may be regarded as an extension of attended point detection. The operations include seed selection and "fuzzy growing". In this implementation, the contrast-based saliency map 216 is a gray-level image in which bright areas are considered to be attended areas, as shown in the example of FIG. 11. Use of a hard cut threshold is not effective for attended areas extraction, because gray-levels in saliency map show continuous variation, even with respect to a single object. Consequently, conventional region growing approaches based on one strict measure are not useful for this solution. Instead, fuzzy theory is employed, since it has been shown to be effective in imitating human mental behavior.

To extract attended areas 220, the contrast-based saliency map 216 is regarded as a fuzzy event modeled by a probability space. Contrast-based saliency map 216 has L gray levels from $g_0$ to $g_{L-1}$ and the histogram of saliency map is $h_k$, k=0, ..., L-1. Accordingly, the contrast-based saliency map 216 is modeled as a triplet $(\Omega, k, P)$, where $\Omega = \{g_0, g_1, \ldots, g_{L-1}\}$ and P is the probability measure of the occurrence of gray levels, i.e., $\Pr\{g_k\} = h_k / \Sigma h_k$. A membership function, $\mu_S(g_k)$, of a fuzzy set $S \in \Omega$ denotes the degree of certain properties, such as attended areas, unattended areas, and so on, possessed by gray level $g_k$. In fuzzy set notation, the membership function can be written as follows:

$$S = \sum_{g_k \in \Omega} \frac{\mu_S(g_k)}{g_k}. \tag{2}$$

The probability of this fuzzy event can be computed by $$P(S) = \sum_{k=0}^{L-1} \mu_S(g_k) P_r(g_k). \tag{3}$$

There are two classes of pixels in the contrast-based saliency map 216: attended areas and unattended areas of pixels. The two classes represent two fuzzy sets, denoted by $B_A$ and $B_U$, respectively, which are mutually exclusive. Thus, these two fuzzy sets partition the contrast-based saliency map 216 ("$\Omega$"). In such a fuzzy partition, there is no sharp boundary between the two fuzzy sets, which is analogous to human perception mechanisms. Fuzzy c-partition entropy is utilized as a criterion to measure the fitness of a fuzzy partition. Theoretically, a fuzzy c-partition is determined by 2(c-1) parameters. Thus, it is useful to find substantially the best combinations of these parameters, which is considered to be a combinatorial optimization problem. Simulated annealing or genetic algorithms are generally used to solve this type of optimization problem. These are very processing and time intensive operations. However, only two (2) parameters are used in the present algorithm due to 2-partition. Therefore, this implementation of the attended area extraction module 208 utilizes an exhaust search to find optimal result without involving high computational complexity.

In the saliency map $\Omega$, considering the two fuzzy events, attended areas $B_A$, and unattended areas $B_U$, the membership functions of fuzzy events are defined in (4) and (5), respectively as follows:

$$\mu_A = \begin{cases} 1 & x \geq a \\ \frac{x-u}{a-u} & u < x < a \\ 0 & x \leq u \end{cases} \tag{4}$$

$$\mu_U = \begin{cases} 0 & x \geq a \\ \frac{x-a}{u-a} & u < x < a \\ 1 & x \leq u \end{cases} \tag{5}$$

wherein x is an independent variable denoting gray level, and a and u are parameters determining shape of the above two membership functions. If an optimization objective function is satisfied, the optimal parameters a and u are obtained. Gray-levels greater than a have the membership of 1.0 for fuzzy set $B_A$, which means the pixels with these gray-levels definitely belong to the attended areas. In distinction, when the gray levels is smaller than u, the membership for fuzzy set $B_A$ becomes zero (0), which means the pixels with these gray-levels do not belong to the attended areas. Similarly, $B_U$ has opposite variation form. While, the pixels with the gray-levels between a and u have the membership of (0, 1) for fuzzy sets $B_A$ and $B_U$ according to the definition (4) and (5), respectively.

Assuming that the prior probabilities of the attended areas 220 and the unattended areas are approximately equal, the optimal partition entails that the difference between the prior entropies of attended areas and that of unattended areas reaches the minimum. A minimal difference of entropy as a metric to obtain optimal threshold for image segmentation is modified in view of a fuzzy set definition as follows:

$$\Gamma(a,u)=[H_A(a,u)-H_U(a,u)]^2 \qquad (6),$$

wherein, $H_A(a, u)$ and $H_U(a, u)$ are prior entropies of fuzzy sets, attended areas 220 and unattended areas (e.g., see the unattended area(s) of "other data" 224 of FIG. 2), respectively. They are calculated as:

$$H_A(a, u) = -\sum_{k=0}^{L-1} \frac{Pr(g_k)}{P(B_A)} \ln \frac{Pr(g_k)}{P(B_A)}; \qquad (7)$$

$$H_U(a, u) = -\sum_{k=0}^{L-1} \frac{Pr(g_k)}{P(B_U)} \ln \frac{Pr(g_k)}{P(B_U)}; \qquad (8)$$

wherein $$P(B_A) = \sum_{k=0}^{L-1} \mu_A Pr(g_k) \text{ and } P(B_U) = \sum_{k=0}^{L-1} \mu_U Pr(g_k)$$

according to equation (3).

Global minima of $\Gamma(a, u)$ indicates the optimal fuzzy partition, i.e., optimal parameters a and u are found. This criterion can be expressed as:

$$(a,u)=\arg\min(\Gamma(a,u)) \qquad (9).$$

With the optimal a and u, fuzzy growing is performed on the contrast-based saliency map 216. A number of initial attention seeds are utilized. Exemplary criteria for seed selection include, for example: the seeds have maximum local contrast; and the seeds belong to the attended areas 220. Sequentially, starting from each seed, the pixels with the gray-levels satisfying the following criteria are grouped by the attended area extraction module 208 as follows:

$$C_{i,j} \leq C_{seed} \text{ and } C_{i,j} > s \qquad (10),$$

wherein, s=(a+u)/2. In this implementation, the probabilities of gray-level s belong to attended areas 220 and unattended areas are all 0.5, see equations (4) and (5). Then, the new group members are used as seeds for iterative growth. Such fuzzy growing process simulates a bottom-up search process in human perception.

FIG. 12 illustrates an exemplary fuzzy 2-partition of the contrast-based saliency map 216 with three layers, which denote a gray level higher than a (highest), s (middle), and u (lowest), correspondingly. FIG. 13 shows exemplary results of fuzzy growing, two main objects in scene being accurately detected and segmented.

In view of the foregoing, attended area seeds are the subset of attended points 218. Points 218 are selected for seeds if they have contrasts greater than a. Then, from each seed, fuzzy growing is carried out until no candidate of perception units can be grouped. This process simulates early stage of human perception during which human search a semantic object looks like what has already been seen.

Attended View Extraction

Attended view extraction module 210, formulated in view of a non-computational Gestalt law of psychology of visual form, extracts an attention center 224 as well as an attended view 222 from the saliency map 216. In particular, it is assumed that since visual forms may possess one or several centers of gravity about which the form is organized, that there is a center of gravity (i.e., an attention center 224) in a saliency map 216, which corresponds to the vision center of the original image 212. Based on the attention center 224, the whole image is organized for information maximization.

In this implementation, an attended view 222 is a rectangle V(C, W, H), where C denotes attention center, W and H are the width and height of rectangle respectively. If contrast (gray level) in a saliency map 216 is regarded as density, the attention center 224 is the centroid of the saliency map 216. Similarly, there is a relationship between the size of attended view 222 and the $1^{st}$ order central moment of the saliency map. Specifically, let $(x_0, y_0)$ denote attention center, and (w', h') denote the $1^{st}$ order central moment of saliency map, the attention center and the attended view's width and height are computed by (11) and (12) respectively, $$\begin{cases} x_0 = \frac{1}{CM} \sum_{j=0}^{N-1} C_{i,j} \times i \\ y_0 = \frac{1}{CM} \sum_{i=0}^{M-1} C_{i,j} \times j \end{cases} \qquad (11)$$

where $$CM = \sum_{i=0}^{M-1} \sum_{j=0}^{N-1} C_{i,j}$$

is the $0^{th}$ order moment of saliency map.

$$\begin{cases} W = 2w = 2\alpha \cdot w' \\ H = 2h = 2\alpha \cdot h' \end{cases} \qquad (12)$$

where $\alpha > 1$ is a constant coefficient. Parameters w' and h' are computed by the $1^{st}$ order central moments of saliency map 216 along x-axis and y-axis respectively, and the $0^{th}$ order moment CM, expressed by (13).

$$\begin{cases} w' = \frac{1}{CM} \sum_{j=0}^{N-1} C_{i,j} \times \|i - x_0\| \\ h' = \frac{1}{CM} \sum_{i=0}^{M-1} C_{i,j} \times \|j - y_0\| \end{cases} \qquad (13)$$

The operation of attended view extraction can be viewed as the last stage of human perception. That is, when a human completes attention searching, views are typically adjusted as a function of the image attention center and attention distributions in the image as a whole.

Referring to FIGS. 15 through 44, all of which are shown on page 5 of the drawings, the Figures in column 1 illustrate examples of original images 212, the Figures in column 2 show examples of contrast-based saliency maps 216, the Figures of column 3 illustrate examples of attended views 222, the Figures of column 4 show exemplary attended areas 220, and the Figures of column 5 illustrate examples of attended points 218. All images of a row 1 though 6 of the FIGS. 15-44 are illustrative of results derived from the systems and methods described herein applied to the leftmost Figure in the row.

An Exemplary Procedure

Figure 45:
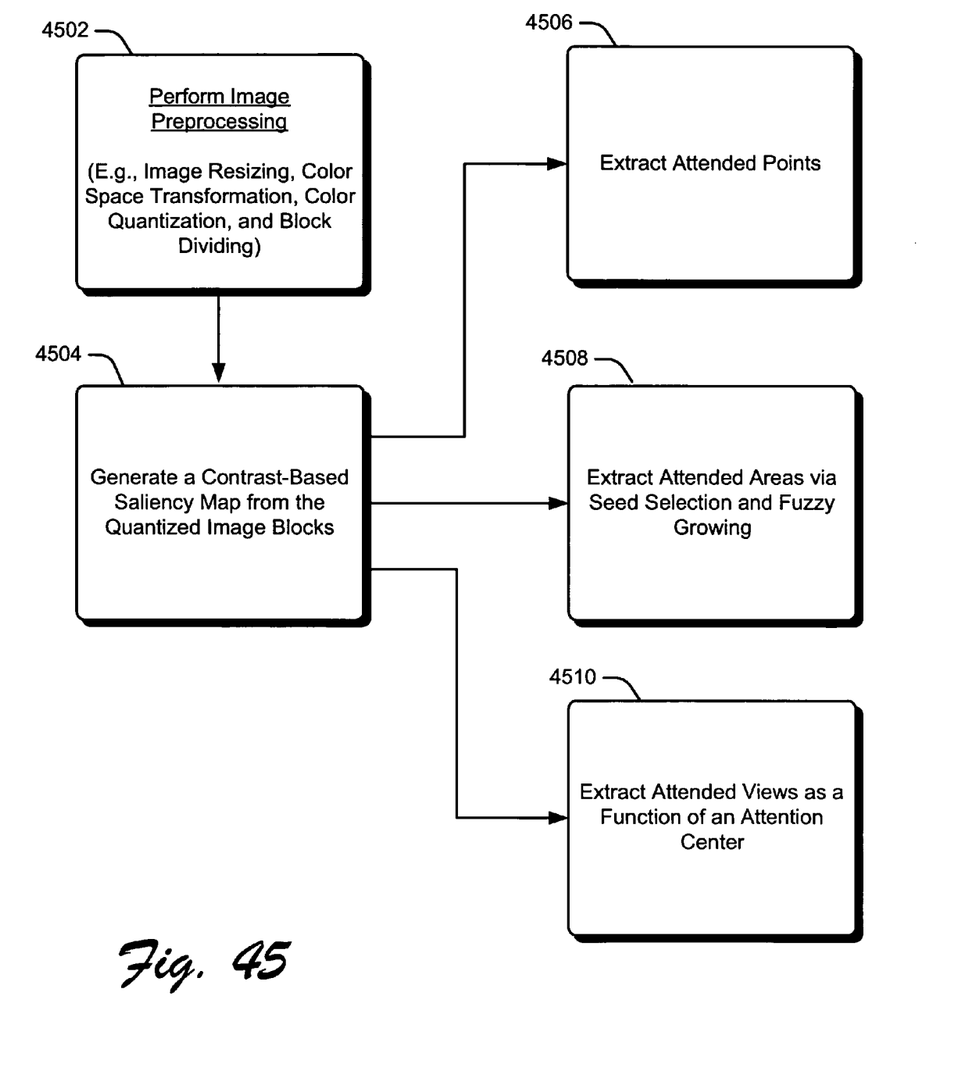
FIG. 45 shows an exemplary procedure for generating a contrast-based saliency map for image attention analysis bases on fuzzy growing.

FIG. 45 shows an exemplary procedure 4500 for generating a contrast-based saliency map for image attention analysis. The operations of the procedure are implemented and described with respect to program modules of FIG. 2. (The left-most digit of a component reference number identifies the particular figure in which the component first appears). At block 4502, the preprocessing module 202 preprocesses an original image 212. Such preprocessing operations include, for example, image resizing, color transformation, and quantization operations, resulting in quantized image blocks 214. At block 4504, the contrast computation and normalization module 204 generates a contrast-based saliency map 216 from the quantized image blocks 214. At block 4506, attended point extraction module 206 extracts attended points 218 from the contrast-based saliency map 216. At block 4508, attended area extraction module 206 extracts attended area 220 from the contrast-based saliency map 216 in view of the attended points 218. At block 4510, the attended view extraction module 210 extracts attended view 222 from the contrast-based saliency map 216.

CONCLUSION

The described systems and methods for generating a contrast-based saliency map for image attention analysis. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter. For instance, with the provided three-level image attention analysis, performance of visual perception systems, multimedia systems, and information searching in large image library can be greatly improved in accuracy, speed and display aspects. Additionally, integration with other image analysis applications, such as a face detection application, can provide additional information to modify attended areas 220 and attended view 222 results (e.g., in view of face rectangle semantics). Analogously, attended areas 220 and attended view 222 results can be used to speed up the process of other image analysis applications such as one that implements a face searching algorithm.

The invention claimed is:

1. A method for modeling image attention, the method comprising:
    preprocessing an image to generate a quantized set of image blocks; and
    generating a contrast-based saliency map for modeling one-to-three levels of image attention from the quantized image blocks; and
    performing a fuzzy growing operation to extract attended areas from the contrast-based saliency map, the fuzzy growing operation comprising:
        partitioning the contrast-based saliency map into two mutually exclusive areas as a function of classes of pixels comprising attended and unattended pixel areas;
        selecting seeds for the fuzzy growing operation according to a set of criteria such that a seed has a local maximum contrast with respect to other regional perception units and the seed belongs to an attended area;
        grouping pixels in the contrast-based saliency map with gray levels that satisfy criteria that indicate attended as compared to unattended areas; and
        iteratively growing the attended area by using grouped pixel as seeds in subsequent fuzzy growth operations until no candidates of the perception units can be grouped.

2. The method of claim 1, wherein preprocessing further comprises:
    resizing the image such that an aspect ratio of the image is maintained;
    transforming the image from a first color space to a second color space that is consistent with human perception; and
    making color in texture areas of the image coarser.

3. The method of claim 1, wherein generating the contrast-based saliency map further comprises:
    dividing the image subsequent to quantization into multiple perception units; and
    calculating a respective contrast of color components for each perception unit; and
    normalizing calculated contrasts to smooth the contrasts.

4. The method of claim 1, further comprising extracting attended points from the contrast-based saliency map.

5. The method of claim 1, further comprising extracting an attended area from the contrast-based saliency map.

6. The method of claim 1, further comprising extracting an attended view from the contrast-based saliency map.

7. A computer-readable medium storing computer-program instructions executable by a processor for modeling image attention, the computer-program instructions when executed by the processor performing operations comprising:
    preprocessing an image to generate a quantized set of image blocks; and
    generating a contrast-based saliency map for three-level contrast-based image attention analysis from the quantized image blocks; and
    performing a fuzzy growing operation to extract attended areas from the contrast-based saliency map, the fuzzy growing operation comprising:
        partitioning the contrast-based saliency map into two mutually exclusive areas as a function of classes of pixels comprising attended and unattended pixel areas;
        selecting seeds for the fuzzy growing operation according to a set of criteria such that a seed has a local maximum contrast with respect to other regional perception units and the seed belongs to an attended area;
        grouping pixels in the contrast-based saliency map with gray levels that satisfy criteria that indicate attended as compared to unattended areas; and
        iteratively growing the attended area by using grouped pixel as seeds in subsequent fuzzy growth operations until no candidates of the perception units can be grouped.

8. A computer-readable medium storing computer-program instructions executable by a processor, the computer-program instructions when executed by the processor for modeling image attention by operations comprising:

generating a preprocessed image by:
  resizing the image such that an aspect ratio of the image is maintained; and
  if the image is not already in a color space that is consistent with human perception, transforming the image from a first color space to a second color space that is consistent with human perception;
quantizing the preprocessed image to generate quantized image perception units such that color in texture areas across the quantized image perception units are coarser as compared to the image;
generating a contrast-based saliency map from the quantized image blocks, the contrast-based saliency map comprising a respective contrast of color components for each perception unit; and
performing a fuzzy growing operation to extract attended areas from the contrast-based saliency map, the fuzzy growing operation comprising:
  partitioning the contrast-based saliency map into two mutually exclusive areas as a function of classes of pixels comprising attended and unattended pixel areas;
  selecting seeds for the fuzzy growing operation according to a set of criteria such that a seed has a local maximum contrast with respect to other regional perception units and the seed belongs to an attended area;
  grouping pixels in the contrast-based saliency map with gray levels that satisfy criteria that indicate attended as compared to unattended areas; and
  iteratively growing the attended area by using grouped pixel as seeds in subsequent fuzzy growth operations until no candidates of the perception units can be grouped.

9. The computer-readable medium of claim 8, wherein the computer-program instructions further comprise instructions for extracting attended points from the contrast-based saliency map.

10. The computer-readable medium of claim 8, wherein the computer-program instructions further comprise instructions for extracting an attended view from the contrast-based saliency map.

11. The computer-readable medium of claim 8, wherein the computer-program instructions further comprise instructions for extracting an attended view from the contrast-based saliency map, the attended view being a rectangle V(C, W, H), where C denotes an attention center, and W and H are the width and height of rectangle respectively, the attention center being a centroid of the contrast-based saliency map.

12. The computer-readable medium of claim 8, wherein the computer-program instructions further comprise instructions for determining a size of an attended view in the contrast-based saliency map, the size being related to a 1st order central moment of the contrast-based saliency map.

13. The computer-readable medium of claim 8, wherein the computer-program instructions further comprise instructions for extracting an attended area from the contrast-based saliency map.

14. The computer-readable medium of claim 8, wherein the computer-program instructions further comprise instructions for extracting attended areas from the contrast-based saliency map by performing the fuzzy growing operation on the contrast-based saliency map as a function of two classes of pixels to partition the contrast-based saliency map into two mutually exclusive areas, the two classes of pixels comprising attended and unattended pixel areas.

15. The computer-readable medium of claim 8, wherein the computer-program instructions further comprise instructions for representing the contrast-based saliency map as a fuzzy event in probability space to extract attended areas.

16. The computer-readable medium of claim 15, wherein the contrast-based saliency map 216 has L gray levels from $g_0$ to $g_{L-1}$ and the histogram of saliency map is $h_k$, $k=0, \ldots, L-1$, and wherein the computer-program instructions further for representing the contrast-based saliency map as a fuzzy event in probability space further comprise instructions for:
  modeling the contrast-based saliency map by a triplet ($\Omega$, k, P), where $\Omega=\{g_0, g_1, \ldots, g_{L-1}\}$ and P is a probability measure of the occurrence of gray levels, i.e., $\Pr\{g_k\}=h_k/\Sigma h_k$;
  denoting a membership function $\mu_S(g_k)$ of a fuzzy set $S \in \Omega$ indicating a degree of properties comprising attended areas possessed by gray level $g_k$; and
  representing the properties as a fuzzy event as follows:

$$S = \sum_{g_k \in \Omega} \mu_S(g_k)/g_k; \text{ and}$$

computing a probability of the fuzzy event by:

$$P(S) = \sum_{k=0}^{L-1} \mu_S(g_k) P_r(g_k).$$

17. A computing device for modeling image attention, the computing device comprising a processor coupled to a memory, the memory comprising computer computer-program instructions executable by the processor for:
  quantizing a preprocessed image to generate quantized image perception units such that color in texture areas across the quantized image perception units are coarser as compared to the image, the preprocessed image being a resized version of the image with an original aspect ratio and in a color space consistent with human perception;
  generating a contrast-based saliency map from the quantized image blocks, the contrast-based saliency map comprising a respective contrast of color components for each perception unit; and
  performing a fuzzy growing operation to extract attended areas from the contrast-based saliency map, the fuzzy growing operation comprising:
    partitioning the contrast-based saliency map into two mutually exclusive areas as a function of classes of pixels comprising attended and unattended pixel areas;
    selecting seeds for the fuzzy growing operation according to a set of criteria such that a seed has a local maximum contrast with respect to other regional perception units and the seed belongs to an attended area;
    grouping pixels in the contrast-based saliency map with gray levels that satisfy criteria that indicate attended as compared to unattended areas; and
    iteratively growing the attended area by using grouped pixel as seeds in subsequent fuzzy growth operations until no candidates of the perception units can be grouped.

18. The computing device of claim 17, wherein the computer-program instructions further comprise instructions for extracting attended points from the contrast-based saliency map.

19. The computing device of claim 17, wherein the computer-program instructions further comprise instructions for extracting an attended area from the contrast-based saliency map.

20. The computing device of claim 17, wherein the computer-program instructions further comprise instructions for extracting an attended view from the contrast-based saliency map.

21. A computing device comprising:
means for preprocessing an image to generate a quantized set of image blocks;
means for generating a contrast-based saliency map for modeling three-levels of image attentions from the quantized image blocks; and
means for performing a fuzzy growing operation to extract attended areas from the contrast-based saliency map, the fuzzy growing operation comprising:
partitioning the contrast-based saliency map into two mutually exclusive areas as a function of classes of pixels comprising attended and unattended pixel areas;
selecting seeds for the fuzzy growing operation according to a set of criteria such that a seed has a local maximum contrast with respect to other regional perception units and the seed belongs to an attended area;
grouping pixels in the contrast-based saliency map with gray levels that satisfy criteria that indicate attended as compared to unattended areas; and
iteratively growing the attended area by using grouped pixel as seeds in subsequent fuzzy growth operations until no candidates of the perception units can be grouped.

22. The computing device of claim 21, wherein the means for generating the contrast-based saliency map further comprises:
means for dividing the image subsequent to quantization into multiple perception units; and
means for calculating a respective contrast of color components for each perception unit; and
means for normalizing calculated contrasts to smooth the contrasts.

23. The computing device of claim 21, further comprising means for extracting attended points from the contrast-based saliency map.

24. The computing device of claim 21, further comprising means for extracting an attended area from the contrast-based saliency map.

25. The computing device of claim 21, further comprising means for extracting an attended view from the contrast-based saliency map.

* * * * *